US011035623B2

(12) United States Patent
Hirata et al.

(10) Patent No.: US 11,035,623 B2
(45) Date of Patent: Jun. 15, 2021

(54) HEAT EXCHANGER, OUTDOOR UNIT, REFRIGERATION CYCLE DEVICE, AND HEAT EXCHANGER MANUFACTURING METHOD

(71) Applicant: HITACHI-JOHNSON CONROLS AIR CONDITIONING, INC., Tokyo (JP)

(72) Inventors: Takumi Hirata, Tokyo (JP); Mamoru Houfuku, Tokyo (JP); Ryoichi Takafuji, Tokyo (JP); Kosuke Kumamoto, Tokyo (JP); Naoki Yamamoto, Tokyo (JP)

(73) Assignee: HITACHI-JOHNSON CONROLS AIR CONDITIONING, INC., Tokyo (JP)

( * ) Notice: Subject to any disclaimer, the term of this patent is extended or adjusted under 35 U.S.C. 154(b) by 62 days.

(21) Appl. No.: 16/288,142

(22) Filed: Feb. 28, 2019

(65) Prior Publication Data

US 2019/0271512 A1 Sep. 5, 2019

(30) Foreign Application Priority Data

Mar. 2, 2018 (JP) .............................. JP2018-037572

(51) Int. Cl.
*F28F 1/12* (2006.01)
*F28D 7/00* (2006.01)
(Continued)

(52) U.S. Cl.
CPC .............. *F28F 1/126* (2013.01); *B23P 15/26* (2013.01); *F25B 13/00* (2013.01); *F28D 7/0066* (2013.01)

(58) Field of Classification Search
CPC .......... F28F 1/126; F28F 19/006; F28F 17/00; F28F 17/005; F28D 7/0066; F28D 1/0471;
(Continued)

(56) References Cited

U.S. PATENT DOCUMENTS

2005/0034471 A1* 2/2005 Shin ...................... F24F 13/222
62/285
2013/0306280 A1 11/2013 Goodman et al.

FOREIGN PATENT DOCUMENTS

EP 3015808 B1 8/2018
JP 63-233296 A 9/1988
(Continued)

OTHER PUBLICATIONS

Japanese Office Action received in corresponding Japanese Application No. 2018-037572 dated Jun. 30, 2020.
(Continued)

*Primary Examiner* — Steve S Tanenbaum
(74) *Attorney, Agent, or Firm* — Mattingly & Malur, PC (57) ABSTRACT

Provided is a heat exchanger which includes: multiple heat transfer pipes in which refrigerant flows; and a corrugated fin joined to the heat transfer pipes; and multiple plate-shaped fins. The plate-shaped fins are joined to at least one of each heat transfer pipe or the corrugated fin, and are arranged on a windward side in an air blowing direction with respect to the corrugated fin such that a plate width direction of each plate-shaped fin is substantially coincident with a plate width direction of the corrugated fin.

7 Claims, 6 Drawing Sheets

(51) Int. Cl.
*F25B 13/00* (2006.01)
*B23P 15/26* (2006.01)

(58) Field of Classification Search
CPC . F25B 13/00; F25B 39/00; B23P 15/26; F24F 1/18
USPC .......................................................... 62/515
See application file for complete search history.

(56) References Cited

FOREIGN PATENT DOCUMENTS

| | | | | |
|---|---|---|---|---|
| JP | 6-123587 A | | 5/1994 | |
| JP | 09101092 A | * | 4/1997 | .............. F28F 1/325 |
| JP | 11-101477 A | | 4/1999 | |
| JP | 2001263861 A | * | 9/2001 | |
| JP | 2007285673 A | * | 11/2007 | |
| JP | 2010-19534 A | | 1/2010 | |
| JP | 2010255916 A | * | 11/2010 | ......... F28D 1/05383 |
| JP | 2012-37092 A | | 2/2012 | |
| WO | 2014/207785 A1 | | 12/2014 | |

OTHER PUBLICATIONS

Japanese Office Action received in corresponding Japanese Application No. 2018-037572 dated Nov. 17, 2020.
Chinese Office Action received in corresponding Chinese Application No. 201910143131.8 dated Jan. 25, 2021.

* cited by examiner

HEAT EXCHANGER, OUTDOOR UNIT, REFRIGERATION CYCLE DEVICE, AND HEAT EXCHANGER MANUFACTURING METHOD

CROSS-REFERENCE TO RELATED APPLICATION

This application claims the benefits of priority to Japanese Patent Application No. 2018-037572 filed with the Japan Patent Office on Mar. 2, 2018, the disclosures of all of which are hereby incorporated by reference in their entireties.

TECHNICAL FIELD

The present disclosure relates to a heat exchanger, an outdoor unit, a refrigeration cycle device, and a heat exchanger manufacturing method.

BACKGROUND ART

A background in the art is disclosed in International Patent Application Publication No. 2014/207785 A. This document describes as follows. "Provided is a heat exchanger that can, even when frosting occurs on an upwind side of the heat exchanger, exchange heat continuously on a downwind side of a fin by securing a ventilation path, and in addition, further improve drainage of the melt water. The heat exchanger of the present invention includes a plurality of tubes each having a refrigerant flow path through which a refrigerant flows and a corrugated fin including a plurality of heat transfer walls that are arranged in a running direction of the tubes and span from one to the other of adjacent tubes among the plurality of tubes, the fin being capable of exchanging heat with the tubes. Each of the heat transfer walls includes a heat transfer piece leading to a leading edge portion positioned on the upwind side of a passing airflow and a leading edge portion indented toward the downwind side in the direction of the airflow A relative to the leading edge portion. A first heat transfer piece is disposed on every other layer of the arrangement on both of a side closer to one tube and a side closer to the other tube of adjacent tubes among the plurality of tubes such that first heat transfer piece appears alternately on both sides." (See ABSTRACT of the document)

SUMMARY OF THE INVENTION

The above-described document discloses the technique of, e.g., improving a heat exchange efficiency by fins extending in a windward direction. However, this technique has such a failure that frost adherence to heat transfer pipes cannot be reduced. For this reason, an object of the present disclosure is to provide a heat exchanger, an outdoor unit, and a refrigeration cycle device configured so that frost adherence to heat transfer pipes can be reduced and to provide the method for manufacturing the heat exchanger.

For solving the above-described problems, a heat exchanger according to one embodiment of the present disclosure includes multiple heat transfer pipes in which refrigerant flows, a corrugated fin joined to the heat transfer pipes, and multiple plate-shaped fins. The plate-shaped fins are joined to at least one of each heat transfer pipe or the corrugated fin. Further, the plate-shaped fins are arranged on a windward side in an air blowing direction with respect to the corrugated fin such that a plate width direction of each plate-shaped fin is substantially coincident with a plate width direction of the corrugated fin.

According to the present disclosure, the heat exchanger, the outdoor unit, and the refrigeration cycle device configured so that frost adherence to the heat transfer pipes can be reduced and the method for manufacturing the heat exchanger can be provided. Other objects, configurations, and advantageous effects than those described above will be apparent from description of an embodiment below.

Figure 1:
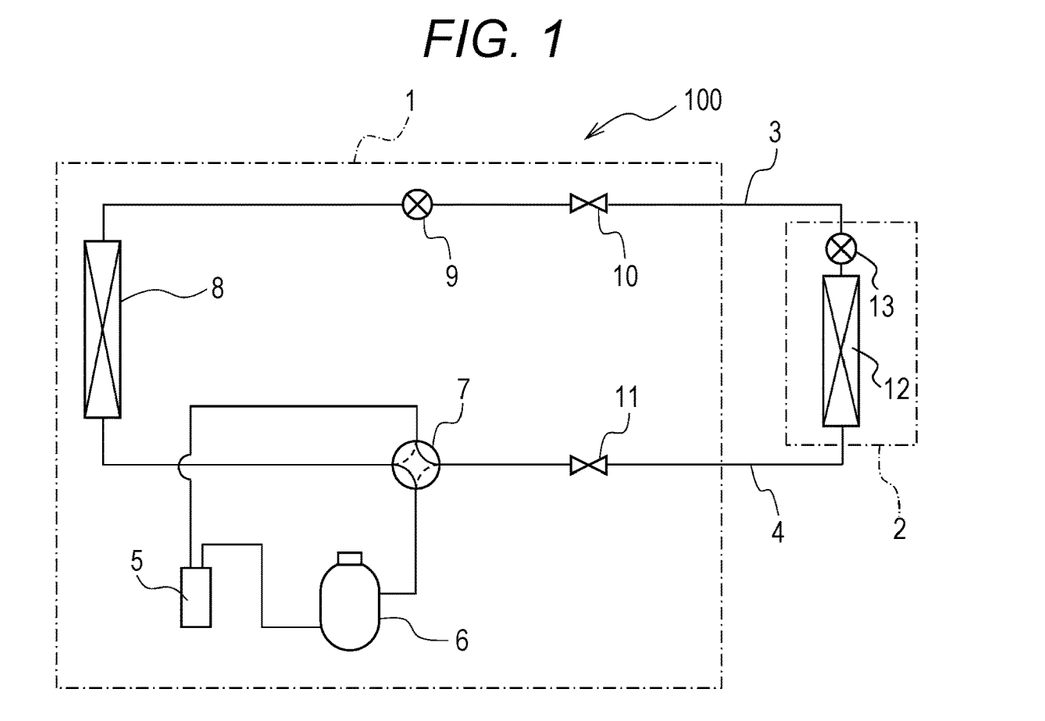
FIG. 1 is a refrigeration cycle system diagram of a refrigeration cycle device according to one embodiment of the present disclosure.

Hereinafter, an embodiment of the present disclosure will be described with reference to the drawings. Note that "front, back, right, left, upper, and lower directions" in description below are according to arrows in each figure. FIG. 1 is a refrigeration cycle system diagram of a refrigeration cycle device 100 of the present embodiment. The refrigeration cycle device 100 is an example of an air-conditioner. The refrigeration cycle device 100 includes an outdoor unit 1 and an indoor unit 2. The outdoor unit 1 and the indoor unit 2 are connected to each other via refrigerant pipes (a liquid-side connection pipe 3 and a gas-side connection pipe 4).

An accumulator 5, a compressor 6, a four-way valve 7, an outdoor heat exchanger 8, a first expansion valve 9 and the like provided at the outdoor unit 1 are connected to pipes such as the liquid-side connection pipe 3 and the gas-side connection pipe 4. Moreover, a liquid blocking valve 10 connected to the liquid-side connection pipe 3 and a gas blocking valve 11 connected to the gas-side connection pipe 4 are provided. An indoor heat exchanger 12, a second expansion valve 13 and the like are provided at the indoor unit 2.

DETAILED DESCRIPTION

Operation in a case where cooling operation is performed in the refrigeration cycle device 100 will be described. High-temperature high-pressure gas refrigerant compressed in the compressor 6 is, together with refrigerator oil, discharged from the compressor 6. Thereafter, the gas refrigerant flows into the outdoor heat exchanger 8 through the four-way valve 7. At this point, the gas refrigerant exchanges heat with, e.g., outdoor air, and is condensed and liquefied. The condensed and liquefied refrigerant passes through the fully-opened first expansion valve 9, and is sent to the indoor unit 2 through the liquid blocking valve 10 and the liquid-side connection pipe 3. The liquid refrigerant having flowed into the indoor unit 2 is depressurized and expanded in the second expansion valve 13. As a result, the refrigerant turning into a low-temperature low-pressure gas-liquid two-phase flow enters the indoor heat exchanger 12. At this point, the refrigerant exchanges heat with a utilization-side medium such as indoor air, thereby cooling the utilization-side medium. In addition, the refrigerant itself is evaporated and vaporized. Thereafter, the gas refrigerant passes through the gas-side connection pipe 4, and returns to the compressor 6 through the gas blocking valve 11, the four-way valve 7, and the accumulator 5. In this manner, a refrigeration cycle is formed. The refrigeration cycle is configured such that normal operation pressure and temperature in the refrigeration cycle are held in such a manner that excess refrigerant in the refrigeration cycle is stored in the accumulator 5.

The refrigeration cycle device 100 operates as follows in the case of performing heating operation. High-temperature high-pressure gas refrigerant compressed in the compressor 6 is, together with refrigerator oil, discharged from the compressor 6. Thereafter, the gas refrigerant flows into the indoor heat exchanger 12 of the indoor unit 2 through the four-way valve 7, the gas blocking valve 11, and the gas-side connection pipe 4. At this point, the gas refrigerant exchanges heat with the utilization-side medium such as indoor air, thereby heating the utilization-side medium. Then, the gas refrigerant itself is condensed and liquefied. The condensed and liquefied refrigerant is depressurized in the first expansion valve 9 through the liquid-side connection pipe 3 and the liquid blocking valve 10. Thereafter, the refrigerant exchanges heat with a heat source medium such as outdoor air in the outdoor heat exchanger 8, and is evaporated and vaporized. The evaporated and vaporized refrigerant returns to the compressor 6 through the four-way valve 7 and the accumulator 5. In this manner, the refrigeration cycle is formed.

Figure 2:
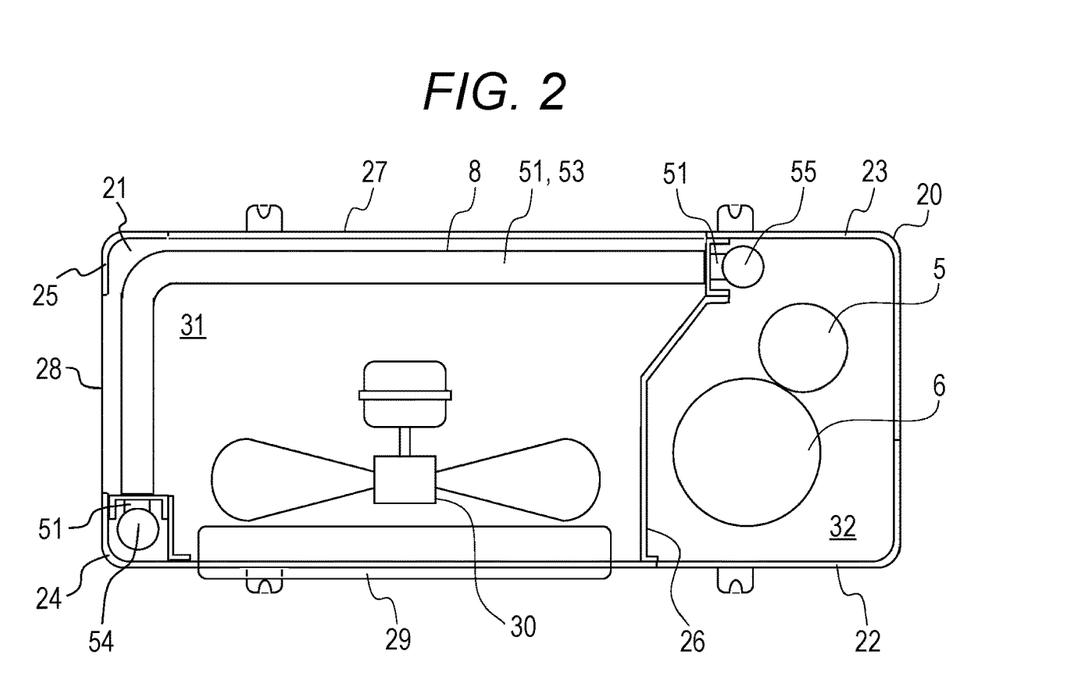
FIG. 2 is a plan view of the inside of an outdoor unit when a top plate of the refrigeration cycle device according to one embodiment of the present disclosure is removed.

The outdoor heat exchanger 8 (a heat exchanger) and the like provided at the outdoor unit 1 as illustrated in FIG. 1 are normally placed inside a housing. FIG. 2 is a plan view of the inside of the outdoor unit 1 when a top plate is removed. A housing 20 of the outdoor unit 1 includes the top plate (not shown), a bottom plate 21, and side plates 22 to 25. An internal space of the housing 20 is, by a partition plate 26, divided into a heat exchange chamber 31 and a machine chamber 32. In the heat exchange chamber 31, the outdoor heat exchanger 8 and an air blower 30 are arranged. In the machine chamber 32, the accumulator 5, the compressor 6 and the like are arranged. The side plates 22 to 25 include a machine-chamber-side front plate 22, a machine-chamber-side back plate 23, a heat-exchange-chamber-side front plate 24, and a heat-exchange-chamber-side back plate 25. The machine chamber 32 may include the machine-chamber-side front plate 22, the machine-chamber-side back plate 23, and the partition plate 26. On the other hand, the heat exchange chamber 31 includes the heat-exchange-chamber-side front plate 24 and the heat-exchange-chamber-side back plate 25. Further, suction ports 27, 28 are each provided between the machine-chamber-side back plate 23 and the heat-exchange-chamber-side back plate 25 and between the heat-exchange-chamber-side front plate 24 and the heat-exchange-chamber-side back plate 25. The suction ports 27, 28 are ports for sucking air. Further, an exhaust port 29 is provided at the heat-exchange-chamber-side front plate 24. Air subjected to heat exchange by the outdoor heat exchanger 8 is discharged from a front surface of the outdoor unit 1 through the exhaust port 29. With this structure, air is, by the air blower 30, first sucked through the suction ports 27, 28 provided at back and side surfaces of the outdoor unit 1. Then, the outdoor heat exchanger 8 exchanges heat between the sucked air and refrigerant. Thereafter, the sucked air can be discharged to the outside of the outdoor unit 1 through the exhaust port 29 provided at the outdoor unit front surface.

The technique disclosed in the above-described document cannot reduce frost adherence to a heat transfer pipe on, e.g., a cold day. For this reason, reduction in frost adherence to a later-described flat heat transfer pipe 51 of the outdoor heat exchanger 8 has been demanded. Moreover, water droplets (including water droplets caused due to melting of frost in defrosting operation) sometimes adhere to the heat exchanger. However, the technique of the above-described document cannot also effectively remove these water droplets.

Figure 3:
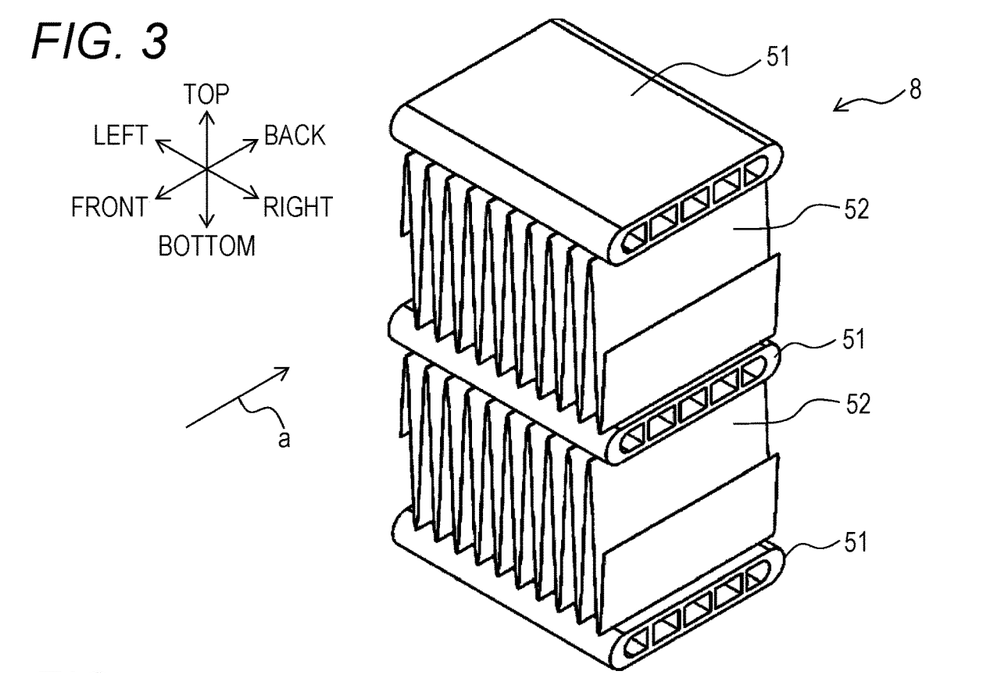
FIG. 3 is a perspective view of part of an outdoor heat exchanger of the refrigeration cycle device according to one embodiment of the present disclosure when plate-shaped fins are removed.
Figure 4:
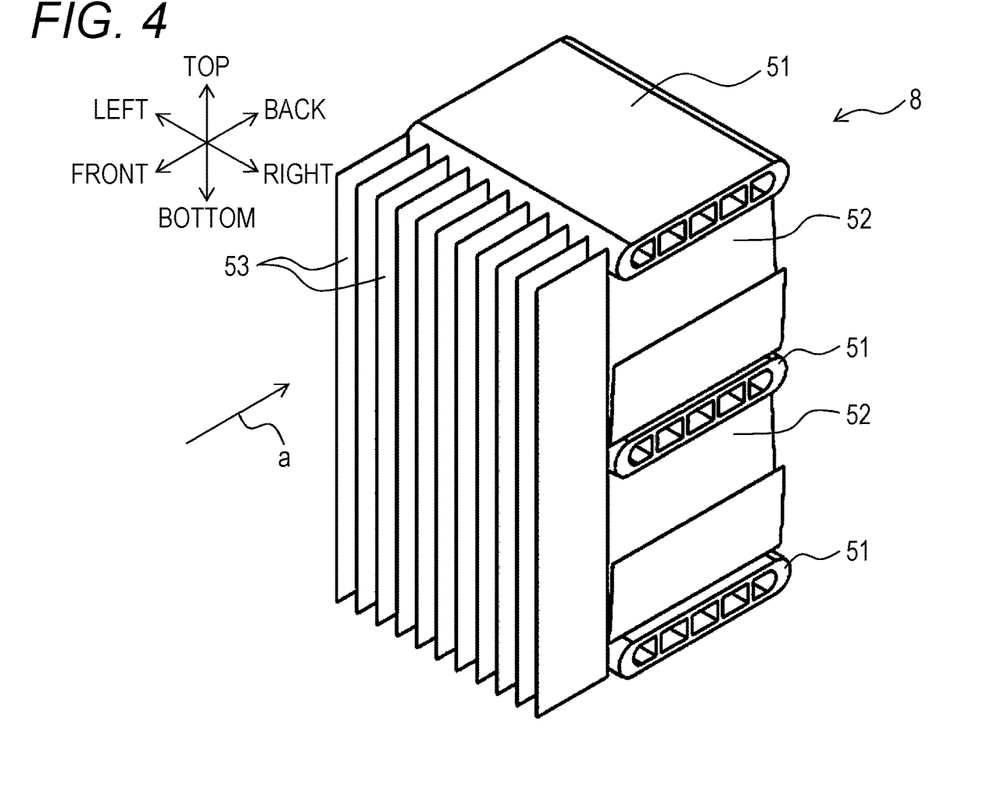
FIG. 4 is a perspective view of the outdoor heat exchanger of the refrigeration cycle device according to one embodiment of the present disclosure.

For these reasons, the outdoor heat exchanger 8 configured so that frost adherence to the later-described flat heat transfer pipe 51 can be reduced and water droplets adhering to the heat transfer pipe can be effectively removed will be described in detail below. FIG. 4 is a perspective view of part of the outdoor heat exchanger 8. FIG. 3 is a perspective view of the outdoor heat exchanger 8 of FIG. 4 when later-described plate-shaped fins 53 are removed.

The outdoor heat exchanger 8 includes the multiple flat heat transfer pipes (heat transfer pipes) 51 in which refrigerant flows and corrugated fins 52 joined to the flat heat transfer pipes 51. In an example of FIGS. 3 and 4, the flat heat transfer pipe 51 has, in a horizontal plane, the direction of extending flatly and a pipe axial direction. In this example, the flat heat transfer pipes 51 made of, e.g., aluminum or aluminum alloy are vertically provided in three tiers. Moreover, the corrugated fin 52 is interposed between adjacent ones of the flat heat transfer pipes 51 in an upper-to-lower direction. In the example of FIGS. 3 and 4, two tiers of the corrugated fins 52 are provided. The corrugated fin 52 is formed in such a manner that a thin metal plate made of, e.g., aluminum or aluminum alloy is bent in a winding shape. Each bent portion of the bent corrugated fin 52 is an upper or lower end of the corrugated fin 52.

As illustrated in FIGS. 3 and 4, air flows into the outdoor heat exchanger 8 from the front side as indicated by an arrow a. Moreover, as illustrated in FIG. 4, the multiple plate-shaped fins 53 are provided on an upstream side (the front side) of air passing through the outdoor heat exchanger 8. The plate-shaped fin 53 is a thin elongated rectangular plate member. The plate-shaped fin 53 is made of, e.g., aluminum or aluminum alloy. Each plate-shaped fin 53 is joined to at least one of the flat heat transfer pipe 51 or the corrugated fin 52. Considering, e.g., strength, each plate-shaped fin 53 is preferably joined to both of the flat heat transfer pipe 51 and the corrugated fin 52. Moreover, in a case where the plate-shaped fin 53 is joined to neither the flat heat transfer pipe 51 nor the corrugated fin 52, the plate-shaped fin 53 contacts these members.

Figure 5:
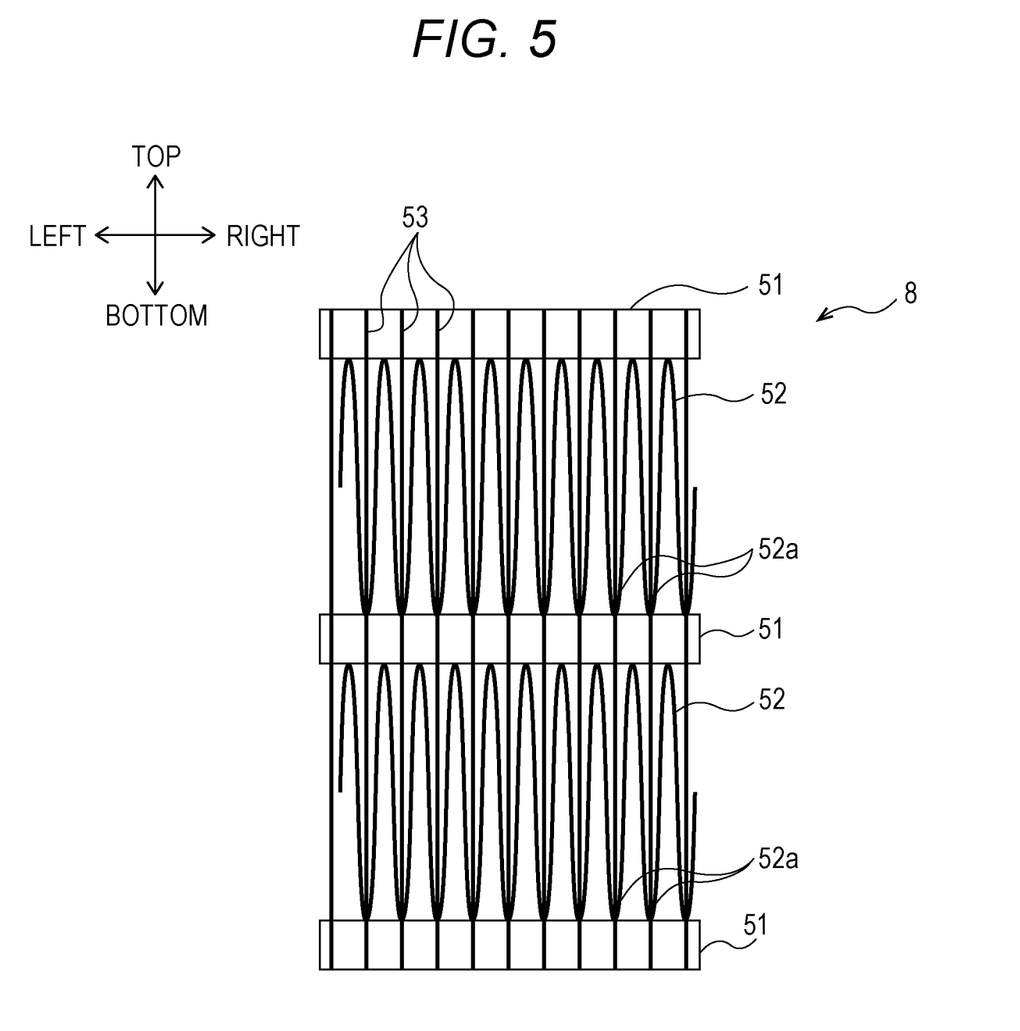
FIG. 5 is a front view of the outdoor heat exchanger of FIG. 4.

FIG. 5 is a front view of the outdoor heat exchanger 8 of FIG. 4. A plate width direction of the plate-shaped fin 53 is substantially coincident with a plate width direction of the corrugated fin 52 (a front-to-back direction). Thus, in FIG. 5, the plate-shaped fins 53 and the corrugated fins 52 are illustrated in linear shapes. The plate-shaped fin 53 extends in the upper-to-lower direction from the uppermost flat heat transfer pipe 51 to the lowermost flat heat transfer pipe 51.

Thus, the plate-shaped fins 53 of FIG. 4 are arranged on a windward side in an air blowing direction (the direction of the arrow a) with respect to the corrugated fins 52 of FIG. 3.

As illustrated in FIG. 5, the fin pitch of the corrugated fin 52 and the fin pitch of the plate-shaped fin 53 are substantially equal to each other. Moreover, each plate-shaped fin 53 is joined to or contacts a lowermost end portion 52a of a corrugated plate shape of the corrugated fin 52. The structure of the outdoor heat exchanger 8 including the flat heat transfer pipes 51, the corrugated fins 52, and the plate-shaped fins 53 has been described above.

Figure 6:
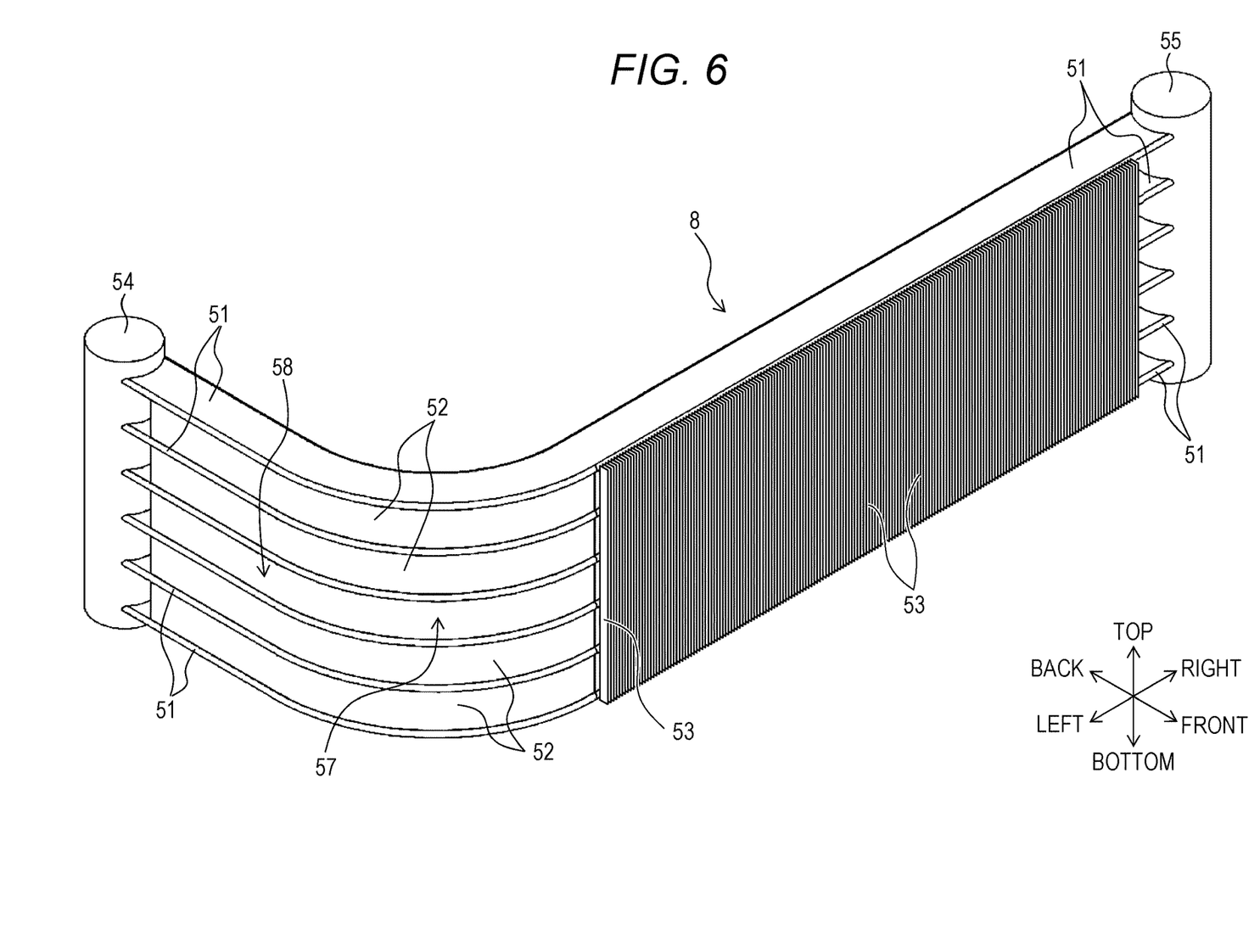
FIG. 6 is a perspective view of the entirety of one example of the outdoor heat exchanger of the refrigeration cycle device according to one embodiment of the present disclosure.

FIG. 6 is a perspective view of the entirety of one example of the outdoor heat exchanger 8 having such a continuous structure. In the example illustrated in this figure, the configuration of the outdoor heat exchanger 8 includes six tiers of the flat heat transfer pipes 51 in the upper-to-lower direction, and five tiers of the corrugated fins 52 in the upper-to-lower direction, each corrugated fin 52 being sandwiched between the flat heat transfer pipes 51 in the upper-to-lower direction. As illustrated in FIG. 6, the outdoor heat exchanger 8 is bent in a substantially L-shape in the horizontal direction. For improving performance in heat exchange between external air and refrigerant, the outdoor heat exchanger 8 is arranged along the suction ports 27, 28 as illustrated in FIG. 2. Note that the bent shape of the outdoor heat exchanger 8 is not limited to the L-shape. The bent shape of the outdoor heat exchanger 8 may be a substantially backwards C-shape. In this manner, heat exchange with inflow air from more directions can be performed. Headers 54, 55 in a pair are each connected to both end portions of each flat heat transfer pipe 51. The headers 54, 55 have the function of properly distributing refrigerant to each flat heat transfer pipe 51.

As illustrated in FIG. 6, the plate-shaped fins 53 are not formed at bent portions 57 of the flat heat transfer pipes 51 of the outdoor heat exchanger 8. Further, no plate-shaped fins 53 are also formed at linear portions 58 extending from the bent portions 57 to the header 54. Each portion of the outdoor heat exchanger 8 including the flat heat transfer pipes 51, the corrugated fins 52, the plate-shaped fins 53, and the headers 54, 55 as described above is preferably joined by brazing.

<Preparation Step>

Next, the method for manufacturing the outdoor heat exchanger 8 will be described. This manufacturing method includes each step described below. First, the flat heat transfer pipes 51, the corrugated fins 52, the plate-shaped fins 53, and the headers 54, 55 are prepared.

<Joint Step>

Of each member including the plate-shaped fins 53 as described above, a portion necessary for brazing joint is coated with a brazing material in advance. Then, these members are assembled into the above-described shape. Support members or temporary joint members (not shown) are arranged at necessary spots. With these members, a positional relationship among these members does not change. The members assembled as described above are mounted on a belt conveyer. Then, the members are carried by the belt conveyer, and enter a furnace. In the furnace, the members are brazed by heating. In this manner, the outdoor heat exchanger 8 can be manufactured, the outdoor heat exchanger 8 including each plate-shaped fin 53 arranged on the windward side in the air blowing direction with respect to the corrugated fins 52 such that the plate width direction of each plate-shaped fin 53 and the plate width direction of the corrugated fin 52 are substantially coincident with each other.

<Bending Step>

Next, a roller (not shown) is placed on portions to be the bent portions 57 of the outdoor heat exchanger 8 manufactured at the joint step, or force is applied to the linear portions 58 of the outdoor heat exchanger 8. In this manner, the bent portions 57 are formed at the outdoor heat exchanger 8. In this case, the outdoor heat exchanger 8 can be bent in the substantially L-shape as described above. Alternatively, the outdoor heat exchanger 8 may be bent in the substantially backwards C-shape.

Next, features and advantageous effects of the present embodiment will be described. As illustrated in FIGS. 4 and 5, the outdoor heat exchanger 8 is arranged such that the plate width direction of each plate-shaped fin 53 is substantially coincident with the plate width direction of the corrugated fin 52 and is substantially perpendicular to an axial direction of the flat heat transfer pipe 51. Further, each plate-shaped fin 53 is arranged on the windward side in the air blowing direction with respect to the corrugated fins 52. Thus, according to the outdoor heat exchanger 8 of the present embodiment, air resistance of the corrugated fins 52 and frost adherence to the flat heat transfer pipes 51 can be reduced as compared to a typical case. Moreover, the plate-shaped fins 53 are joined to the flat heat transfer pipes 51 or the corrugated fins 52 by brazing. Thus, the process of joining many plate-shaped fins 53 to the outdoor heat exchanger 8 is relatively easily performed.

Further, the fin pitch of the corrugated fin 52 and the fin pitch of the plate-shaped fin 53 are substantially equal to each other. Moreover, each plate-shaped fin 53 is joined to or contacts the lowermost end portion 52a of the corrugated shape of the corrugated fin 52. Water droplets adhering to the flat heat transfer pipes 51 and the corrugated fins 52 easily flow down due to the weights thereof. Thus, the water droplets tend to be accumulated at the lowermost end portions 52a of the corrugated shape of the corrugated fins 52 each having substantially U-shaped or V-shaped sections. Moreover, the plate-shaped fins 53 are joined to or contact these lowermost end portions 52a. Thus, the water droplets easily flow down to the outside along the plate-shaped fins 53. Consequently, according to the outdoor heat exchanger 8 of the present embodiment, drainage performance of the outdoor heat exchanger 8 can be improved. In addition, not only the corrugated fins 52 but also the plate-shaped fins 53 are added to the outdoor heat exchanger 8 of the present embodiment. Thus, heat exchange performance between refrigerant and air can be improved due to the increased fins.

No plate-shaped fins 53 are provided at the bent portions 57 and the linear portions 58 of the outdoor heat exchanger 8. This is, as described above regarding the bending step, because the roller is placed on the portions to be the bent portions 57 of the outdoor heat exchanger 8 or the force is applied to the linear portions 58 of the outdoor heat exchanger 8, and in this manner, the bent portions 57 are formed at the outdoor heat exchanger 8. That is, if the plate-shaped fins 53 are provided at the portions to be the bent portions 57 or the linear portions 58, these plate-shaped fins 53 are bent at the bending step. Thus, in the outdoor heat exchanger 8 formed as described above, air blocked by the bent plate-shaped fins 53 less passes through the corrugated fins 52. On the other hand, according to the outdoor heat exchanger 8 of the present embodiment, the plate-shaped fins 53 are formed at neither the bent portions 57 nor the linear portions 58. Thus, no bending of the plate-shaped fins 53 is caused at these portions. Thus, air passage to the corrugated fins 52 is less interfered.

Note that for forming the bent portions 57, the force can be, in various forms, applied to the outdoor heat exchanger 8. Thus, when no bending is caused at the plate-shaped fins 53 according to the method for applying the force, the plate-shaped fins 53 may be provided at the bent portions 57 or the linear portions 58.

Figure 7:
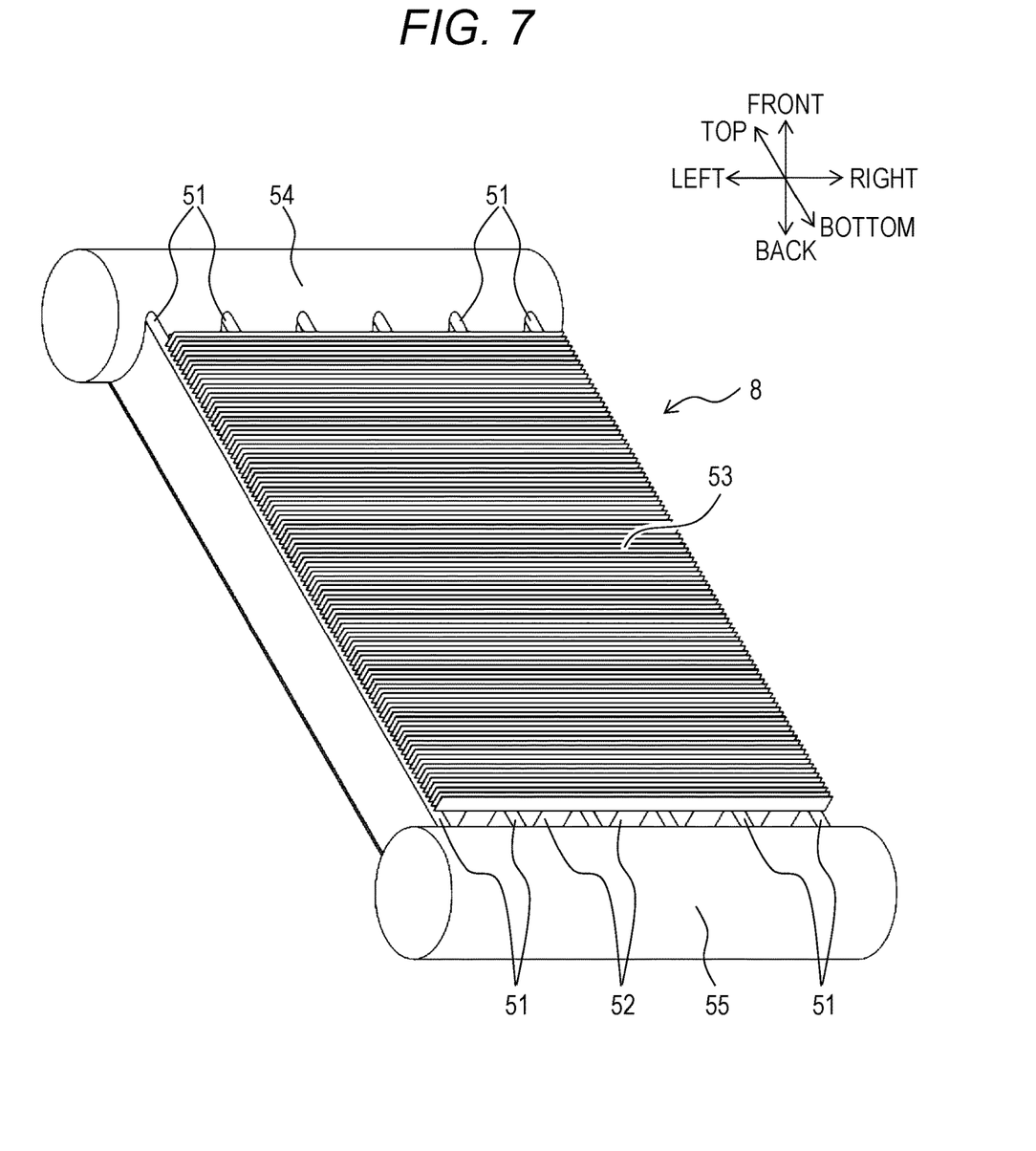
FIG. 7 is a perspective view of one example of an outdoor heat exchanger of a refrigeration cycle device according to another embodiment of the present disclosure.
Figure 8:
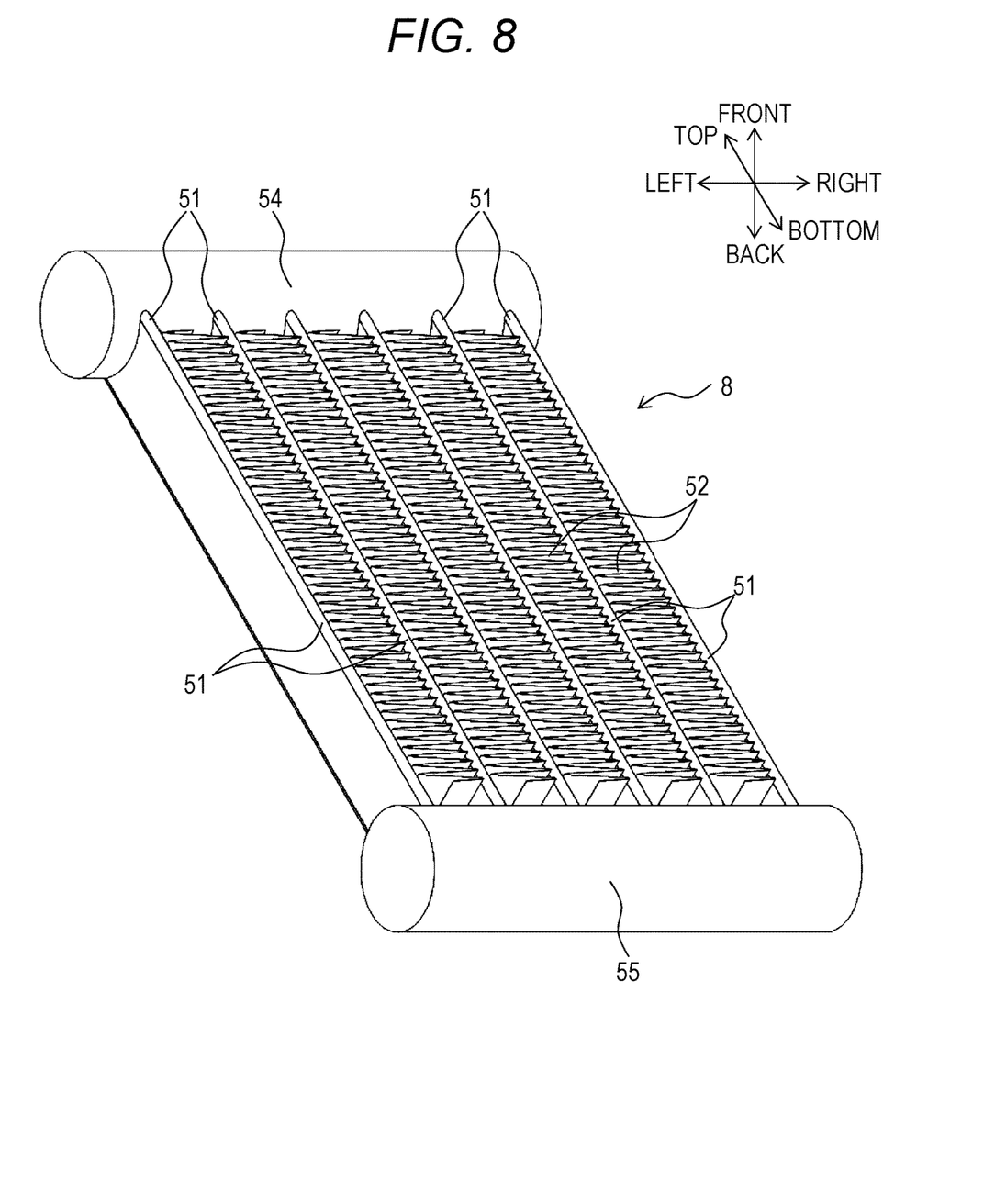
FIG. 8 is a perspective view of the outdoor heat exchanger of FIG. 7 when plate-shaped fins are removed.

FIG. 7 is a perspective view of a variation of the outdoor heat exchanger 8 of the above-described embodiment. FIG. 8 is a perspective view of the outdoor heat exchanger of FIG. 7 when the plate-shaped fins 53 are removed. In the present variation, the direction of arrangement of the outdoor heat exchanger 8 is different from that of the above-described embodiment. That is, longitudinal and width directions of the outdoor heat exchanger 8 of the present variation are different from those of the above-described embodiment by 90°. That is, in the present variation, a longitudinal direction of the pair of headers 54, 55 is substantially in the horizontal plane. A longitudinal direction of each flat heat transfer pipe 51 is the substantially perpendicular direction. Thus, the direction of a front surface of the corrugated fin 52 is also different from that of the above-described embodiment by 90°. That is, a longitudinal direction of the plate-shaped fin 53 is also substantially in the horizontal plane. As described above, the directions different from those of the above-described embodiment by 90° may be employed to attach the outdoor heat exchanger 8 to the inside of the housing 20. Note that unlike the above-described embodiment, the outdoor heat exchanger 8 has no bent portions 57 in the present variation. That is, an example of the outdoor heat exchanger 8 formed in a linear shape as a whole is illustrated. Needless to say, the outdoor heat exchanger 8 of the present variation may be bent in an L-shape or a backwards C-shape as in the above-described embodiment.

Note that the embodiment of the present disclosure is not limited to one described above. The embodiment of the present disclosure includes variations of the above-described embodiment. For example, in the above-described embodiment, detailed description thereof has been made for the sake of simplicity in description of the present embodiment. Note that the embodiment of the present disclosure is not limited to one including all of the configurations described above. Moreover, some of configurations of a certain embodiment may be replaced with configurations of other embodiments. Further, configurations of other embodiments may be added to configurations of a certain embodiment. In addition, some of configurations of each embodiment may be omitted or replaced with some of configurations of other embodiments. Moreover, some of other configurations may be added to configurations of each embodiment.

For example, the example where the heat exchanger of the disclosure is applied to the outdoor heat exchanger 8 has been described above as each embodiment. However, the outdoor heat exchanger 8 may be also applied to the indoor heat exchanger 12. Moreover, the example of the refrigeration cycle device 100 as the air-conditioner has been described above as each embodiment. However, the heat exchanger according to the present embodiment may be applied to other types of refrigeration cycle devices such as a natural refrigerant heat pump water heater. The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A heat exchanger comprising:
multiple heat transfer pipes in which refrigerant flows;
a corrugated fin joined to the heat transfer pipes; and
multiple plate-shaped fins,
wherein the plate-shaped fins are joined to at least one of each heat transfer pipe or the corrugated fin, and are arranged on a windward side in an air blowing direction with respect to the corrugated fin such that a plate width direction of each plate-shaped fin is substantially coincident with a plate width direction of the corrugated fin, and
the plate-shaped fins extend from the heat transfer pipe, located at one end in a longitudinal direction of the plate-shaped fin, to the heat transfer pipe, located at the other end in the longitudinal direction, so as to be aligned in a direction perpendicular to the longitudinal direction at an interval substantially equal to a fin pitch of the corrugated fin.

2. The heat exchanger according to claim 1, wherein each plate-shaped fin is joined to or contacts a lowermost end portion of a corrugated shape of the corrugated fin.

3. The heat exchanger according to claim 1, wherein the plate-shaped fins are arranged at other portions than bent portions of the heat transfer pipes.

4. The heat exchanger according to claim 1, further comprising:
a header joined to each heat transfer pipe and having a longitudinal direction of the header oriented substantially horizontally,
wherein a longitudinal direction of each heat transfer pipe is a-substantially perpendicular to a longitudinal direction of the header.

5. The heat exchanger according to claim 1, wherein the plate-shaped fins are, by brazing, joined to at least one of each heat transfer pipe or the corrugated fin.

6. An outdoor unit comprising:
a housing having a suction port formed at a side portion;
the heat exchanger according to claim 1, the heat exchanger being housed in the housing; and
an air blower configured to take in external air through the suction port and blow the external air to the heat exchanger.

7. A refrigeration cycle device comprising:
an indoor unit;
the outdoor unit according to claim 6, the outdoor unit being connected to the indoor unit via a refrigerant pipe;
a compressor connected to the refrigerant pipe and configured to compress refrigerant; and
an expansion valve connected to the refrigerant pipe and configured to depressurize refrigerant.

* * * * *